United States Patent
Courjaud

(10) Patent No.: US 10,020,632 B2
(45) Date of Patent: Jul. 10, 2018

(54) UV-VISIBLE LASER SYSTEM HAVING ULTRASHORT HIGHPOWER AND/OR HIGH-ENERGY PULSES

(71) Applicant: AMPLITUDE SYSTEMES, Pessac (FR)

(72) Inventor: Antoine Courjaud, Leognan (FR)

(73) Assignee: AMPLITUDE SYSTEMES, Pessac (FR)

( * ) Notice: Subject to any disclaimer, the term of this patent is extended or adjusted under 35 U.S.C. 154(b) by 0 days.

(21) Appl. No.: 15/322,737

(22) PCT Filed: Jul. 3, 2015

(86) PCT No.: PCT/FR2015/051847
§ 371 (c)(1),
(2) Date: Dec. 29, 2016

(87) PCT Pub. No.: WO2016/001604
PCT Pub. Date: Jan. 7, 2016

(65) Prior Publication Data
US 2017/0141530 A1    May 18, 2017

(30) Foreign Application Priority Data
Jul. 3, 2014    (FR) ...................................... 14 56388

(51) Int. Cl.
G02F 1/35    (2006.01)
G02F 2/02    (2006.01)
(Continued)

(52) U.S. Cl.
CPC ........ *H01S 3/2391* (2013.01); *B23K 26/0608* (2013.01); *B23K 26/0613* (2013.01);
(Continued)

(58) Field of Classification Search
None
See application file for complete search history.

(56) References Cited

U.S. PATENT DOCUMENTS 7,352,505 B2 *    4/2008    Nebel ................... G02F 1/3534
                                                    359/329
7,920,606 B2 *    4/2011    Starodoumov ....... G02F 1/3532
                                                    372/22
(Continued)

FOREIGN PATENT DOCUMENTS

WO             0229945         4/2002

OTHER PUBLICATIONS

C. Vicario, A. Trisorio, C. P. Hauri, and G. Arisholm, "Efficient broad-band harmonic generation for UV picosecond temporal pulse shaping," in CLEO:2011—Laser Applications to Photonic Applications, OSA Technical Digest (CD) (Optical Society of America, 2011), paper CMC7.*
(Continued)

*Primary Examiner* — Rhonda Peace
(74) *Attorney, Agent, or Firm* — Young & Thompson

(57) ABSTRACT

Disclosed is a UV-visible laser system having ultrashort pulses with high power and/or high energy. The laser system includes at least one non-linear optical crystal (1) adapted for receiving two distinct ultrashort laser pulses (31, 32) in the visible or infrared domain emitted respectively by two distinct laser pulse sources (11, 12) and a temporal synchronization unit (41, 42) adapted so that the two ultrashort laser pulses (31, 32) are superimposed in time and space in the non-linear optical crystal (1) with any phase shift, and generate, by sum frequency, an ultrashort laser pulse (131) having an optical frequency equal to the sum of the respective optical frequencies of the two distinct laser pulses (31, 32).

24 Claims, 2 Drawing Sheets

(51) Int. Cl.
    *H01S 3/23*     (2006.01)
    *H01S 3/067*     (2006.01)
    *H01S 3/00*     (2006.01)
    *B23K 26/0622*     (2014.01)
    *B23K 26/06*     (2014.01)
    *H01S 3/16*     (2006.01)

(52) U.S. Cl.
    CPC .......... *B23K 26/0624* (2015.10); *H01S 3/005* (2013.01); *H01S 3/0092* (2013.01); *H01S 3/067* (2013.01); *H01S 3/2308* (2013.01); *H01S 3/06754* (2013.01); *H01S 3/1608* (2013.01); *H01S 3/1618* (2013.01)

(56) References Cited

U.S. PATENT DOCUMENTS 8,374,206 B2 *   2/2013   Peng ....................... H01S 3/005
                                                                   372/25
9,525,264 B2 *   12/2016   Courjaud .............. H01S 3/2325
2010/0150183 A1   6/2010   Starodoumov et al.
2011/0267671 A1   11/2011   Peng et al.
2017/0141530 A1 *   5/2017   Courjaud ........... B23K 26/0608

OTHER PUBLICATIONS

Zhao et al., "Sum-frequency generation between an actively synchronized ultrashort TI:sapphire laser and a Nd: YV04 laser", Journal of the Optical Society of America—B, Optical Society of America, Washington, US, vol. 25, No. 7, Apr. 24, 2008, XP007907952, pp. B39-B43.

Zhou, Zhi-Yuan, et al. "Generation of light with controllable spatial patterns via the sum frequency in quasi-phase matching crystals." arXiv preprint 1405.1884 (May 8, 2014), https://arxiv.org/abs/1405.1884.†

Hommel, E. L., and Heather C. Allen. "Broadband sum frequency generation with two regenerative amplifiers: Temporal overlap of femtosecond and picosecond light pulses." Analytical sciences 17.1 (2001): 137-139.†

* cited by examiner
† cited by third party

UV-VISIBLE LASER SYSTEM HAVING ULTRASHORT HIGHPOWER AND/OR HIGH-ENERGY PULSES

TECHNICAL FIELD

The present invention relates to a laser system having ultrashort high-power and/or high-energy pulses in the ultraviolet-visible (UV-visible) spectral domain.

More precisely, the invention relates to a laser system for generating ultrashort UV-visible laser pulses using a non-linear optical device for converting the optical frequency so as to control the optical frequency of the output laser pulses. In the present document, the term optical-frequency conversion covers non-linear optical techniques for generating sum frequency and generating multiple harmonics.

In the present document, ultrashort pulses means pulses with a picosecond, sub-picosecond or femtosecond duration. More precisely, picosecond pulse means a light pulse with a duration of between 1 ps and 20 ps and femtosecond pulse means a light pulse with a duration of between 1 fs and 1 ps. A laser system having ultrashort pulses generally emits at a high repetition rate, generally between 50 kHz and 10 MHz. Thus a laser system having ultrashort pulses with a rate of 1 MHz emits a train of ultrashort pulses, each pulse having a ps or fs duration, with a time interval of around one microsecond between successive pulses. High-power pulse means a light pulse having an average power of between 10 W and 1 MW and preferably greater than or equal to 10 W, and high-energy pulse means a light pulse having an energy of between 100 µJ and 1 kJ and preferably greater than or equal to 1 mJ. It is considered here that the ultraviolet (UV) spectral domain extends from 200 nm to 450 nm, the visible domain from 450 nm to 750 nm and the infrared domain from 750 nm to 1600 nm.

Optical frequency ν means a variable inversely proportional to the wavelength λ of an optical radiation, defined by the equation: $\nu = c/\lambda$, where c represents the speed of light in vacuum.

PRIOR ART

Ultrashort-pulse lasers find many applications comprising laser micromachining, laser marking, analytical chemistry, nanosurgery and ophthalmic surgery.

It is wished to develop ultrashort-pulsed lasers in the UV-visible domain, at wavelengths ranging from lower and lower in the UV range, at higher and higher pulse energies and/or with a higher and higher pulse power.

Generally, a UV-visible laser pulse system is based on an infrared laser source and a non-linear optical device for converting optical frequency, for example by sum frequency (also referred to as the generation of harmonics). This is because high-performance crystal or fiber optic sources and amplifiers in the infrared domain are available, because of the existence of tried and tested industrial technologies. Such ultrashort-pulse infrared laser sources make it possible to generate and amplify high-power and/or high-energy laser pulses in the infrared domain. A non-linear optical device for converting optical frequency by sum frequency makes it possible to convert the infrared laser pulses into laser pulses having an optical frequency equal to a double, triple or quadruple harmonic of the optical frequency of the infrared pulses. In this way a source of ultrashort UV-visible laser pulses is obtained.

Sum frequency consists in fact of producing optical radiation at the optical frequency ν3 from two radiations with optical frequencies ν1 and ν2 respectively, linked by the following equation between the optical frequencies:

$$\nu 3 = \nu 1 + \nu 2$$

This equation is then equivalent to the following equation between the respective wavelengths:

$$1/\lambda 3 = 1/\lambda 1 + 1/\lambda 2$$

By way of illustrative example, FIG. 1 shows a conventional UV-visible ultrashort pulse laser configuration for frequency conversion. This UV-visible pulse laser comprises a source 11 of near infrared pulses and a frequency-conversion non-linear optical device based here on the use of two non-linear optical crystals 1, 2 disposed in series. For example, the source 11 is an ytterbium doped fiber laser source. The source 11 of infrared laser pulses emits ultrashort light pulses 110 at a wavelength λ1, in the infrared. A first non-linear optical crystal 1 receives the infrared light pulses 110. Under particular conditions, in particular of intensity of the light pulses 110 and phase matching, the first non-linear optical crystal 1 generates light pulses 111 at a wavelength λ2 different from the wavelength λ1. In particular, when the non-linear optical crystal operates in frequency doubling, the wavelength λ2 is equal to half the wavelength λ1. For example, if the wavelength λ1 is equal to 1030 nm, the wavelength λ2 is equal to 515 nm. The energy transfer from the wavelength λ1 to the wavelength λ2 in the non-linear optical crystal is partial, so that, at the output of the first non-linear optical crystal 1, there is a pulse 111 at a wavelength λ2 and a pulse 110 at a wavelength λ1.

In the example in FIG. 1, another non-linear optical crystal 2 is disposed on the optical path at the output of the first non-linear optical crystal 1. The other non-linear optical crystal 2 receives light pulses 110 at a wavelength λ1 and light pulses 111 at a wavelength λ2, the light pulses 110 and 111 coming from the same source 11. Under particular phase-matching conditions, the other non-linear optical crystal 2 generates, by sum frequency, other light pulses 112 at a wavelength λ3 different from the wavelengths λ2 and λ1. Thus the other light pulses 112 have an optical frequency equal to the sum of optical frequencies of the two incident light pulses 110, 111. Such a device makes it possible to obtain frequency harmonics that are triple or quadruple the frequency of the source pulses, the wavelength λ3 of the light pulses 112 being respectively equal to one third or one quarter of the wavelength λ1 of the light pulses 110 emitted by the infrared pulse source 11. It is thus possible for example, for a wavelength λ1 of 1030 nm, to obtain pulses at a wavelength λ3 equal to 343.3 nm in the case of tripling, or 257.5 nm in the case of quadrupling.

A single conversion by frequency doubling does not make it possible to achieve wavelengths in the ultraviolet when the laser source 11 generates light pulses 110 in the near infrared. The generation of triple or quadruple harmonics is in general necessary for obtaining pulses in the ultraviolet.

However, the efficiency of the frequency conversion by harmonic generation in a non-linear optical crystal decreases as the harmonic multiplication factor increases. Thus the efficiency of the frequency conversion may reach 50% to 70% for frequency doubling but only 20% to 30% for frequency tripling and 10% to 25% for frequency quadrupling.

In the case of a source of infrared pulses with a conventional fiber optic of great length, for example an erbium doped or erbiumytterbium co-doped fiber optic, the fiber optic is limited in terms of energy. When high-energy ultrashort pulses are amplified in a system of the chirped pulse amplification (CPA) type, these prestretched pulses undergo non-linear distortions that are added to each other during amplification in the amplifying fiber. The UV-visible pulses at the output of the frequency converter are in this case limited in energy by the maximum energy of the optical-fiber infrared pulse source.

In the case of a crystal solid laser source, for example an Yb:YAG laser, the crystal laser is limited in power because of the thermal effects in the crystal. The UV-visible pulses at the output of the frequency converter are in this case limited in power by the maximum power of the crystal solid laser source.

In the case of an amplifying medium of the large mode area (LMA) fiber type, with a large core diameter and a short length (50 cm to a few metres), this is an intermediate case between conventional fiber lasers and solid lasers, wherein the UV-visible pulses output from the frequency converter are limited in power and/or energy by the maximum power and/or energy of the large mode area fiber laser source.

TECHNICAL PROBLEM

In general terms, the power and/or energy of the laser pulses 111 or 112, with a picosecond or femtosecond duration, obtained by frequency conversion, is therefore limited by the power and/or energy of the laser source 11 used and by the conversion efficiency in the non-linear optical crystal or crystals used.

One of the aims of the invention is to increase the energy and/or power of an ultrashort pulse source in the UV-visible domain, in particular when the source is based on a fiber optic technology. Another aim of the invention is to reduce the wavelength towards the ultraviolet in a high-energy and/or high-power ultrashort pulse source. Yet another aim of the invention is to improve the stability over time of a high-energy and/or high-power UV-visible ultrashort pulse laser.

Moreover, there exists a need for a system and method for increasing the power and/or energy of the laser pulses at the output of a high-energy and/or high-power ultrashort pulse UV-visible laser using a non-linear optical device for frequency conversion.

Moreover, there exists a need for a high-energy and/or high-power ultrashort pulse laser with shorter wavelengths in the ultraviolet, and preferably based on a fiber optic laser technology.

The aim of the present invention is to remedy the drawbacks of the prior techniques and relates more particularly to a high-power and/or high-energy ultrashort pulse UV-visible laser system.

According to the invention, the laser system comprises a plurality of laser pulse sources, where the plurality of sources comprises between two and five distinct sources, each laser pulse source being adapted for emitting at least one ultrashort laser pulse in the visible or infrared domain; at least one non-linear optical crystal adapted for receiving two ultrashort laser pulses, said two ultrashort laser pulses being emitted respectively by two distinct laser pulse sources and synchronisation means adapted for synchronising in time said two ultrashort laser pulses incident on said non-linear optical crystal, so that said two ultrashort laser pulses are superimposed in time and space in said non-linear optical crystal with any phase shift, said at least one non-linear optical crystal being adapted for generating, by sum frequency, a frequency converted ultrashort laser pulse, having an optical frequency equal to the sum of the respective optical frequencies of the two ultrashort laser pulses superimposed in time and space in said non-linear optical crystal.

By any phase shift it is meant here that the phase shift between two ultrashort pulses issuing from two distinct sources and superimposed in the non-linear optical crystal can take any value. In addition, this any phase shift may vary over time from one pair of ultrashort pulses to another pair of ultrashort pulses to be superimposed in the same non-linear optical crystal.

The UV-visible laser system makes it possible to increase the power and/or energy of the frequency-converted ultrashort pulses, without increasing the frequency-conversion losses. The energy and/or power of the ultrashort UV-visible pulses increases according to the number of sources used.

The system of the invention makes it possible to produce a pulse with a predetermined conversion efficiency. When the laser system generates a train of ultrashort pulses with a certain repetition rate, the system of the invention makes it possible to ensure the stability of the efficiency of frequency conversion from one pulse to the following pulse, and therefore the stability of the power and/or energy of the UV-visible ultrashort pulses.

The system of the invention does not require an interferometric system for measuring and controlling the optical phase shift between each pair of ultrashort pulses superimposed in a frequency-conversion non-linear optical crystal. A simple temporal synchronisation system replaces the interferometric system normally used in a laser operating in nanosecond regime, to achieve the phase-matching condition between the beams superimposed in a non-linear optical crystal with frequency conversion by sum frequency. The phase shift may be fluctuating from one ultrashort pulse to the following ultrashort pulse. On the contrary, in nanosecond regime, it is necessary to control the phase matching for each pair of pulses in a pulse train that it is wished to convert in frequency in a non-linear optical crystal. This is because, in injected nanosecond regime, a laser in general emits a plurality of longitudinal modes, which generates instabilities from one ns pulse to the following ns pulse. In a particularly advantageous manner, in ps or fs regime, the ultrashort pulse trains have great stability over periods that may range up to several minutes.

According to a particular and advantageous embodiment, the laser system comprises N non-linear optical crystals, where N is an integer number greater than or equal to two, each non-linear optical crystal being adapted for receiving two distinct laser pulses emitted respectively by two distinct laser pulse sources or generated by sum frequency conversion from two ultrashort laser pulse sources, said two laser pulses incident on a non-linear optical crystal being synchronised timewise, and said N non-linear optical crystals being disposed so as to generate, by successive sum frequency in said N non-linear optical crystals, a frequency-converted laser pulse.

According to an embodiment, the pulse laser system comprises two distinct laser pulse sources, each laser pulse source being adapted for emitting an ultrashort laser pulse, in the visible or infrared domain, and a non-linear optical crystal adapted for receiving simultaneously an ultrashort laser pulse from each of the two distinct laser pulse sources, the non-linear optical crystal being adapted for generating, by sum frequency, an ultrashort laser pulse, having an optical frequency equal to the sum of the optical frequencies of the two sources.

According to another embodiment, the number N is equal to three, the pulse laser system comprising three distinct laser pulse sources, each laser pulse source being adapted for emitting an ultrashort laser pulse in the visible or infrared domain; and a first non-linear optical crystal adapted for receiving simultaneously two ultrashort laser pulses emitted respectively by two from among the three distinct laser pulse sources, the synchronisation means being adapted for synchronising timewise said two laser pulses incident on the first non-linear optical crystal so that said two incident laser pulses are superimposed in time and space in the first non-linear optical crystal with any phase shift, the first non-linear optical crystal being adapted for generating, by sum frequency, a frequency-converted ultrashort laser pulse having an optical frequency equal to the sum of the optical frequencies of said two sources, a second non-linear optical crystal being adapted for receiving simultaneously said frequency-converted ultrashort laser pulse and another ultrashort laser pulse emitted respectively by the other laser pulse source from among the three laser pulse sources, the synchronisation means being adapted for synchronising timewise said frequency converted ultrashort laser pulse and said other ultrashort laser pulse that are incident on the second non-linear optical crystal so that said ultrashort laser pulses are superimposed in time and space in the second non-linear optical crystal with any phase shift, the second non-linear optical crystal being adapted for generating, by sum frequency, an ultrashort laser pulse having an optical frequency equal to the sum of the optical frequencies of said three sources.

According to a particular and advantageous aspect of the invention, each laser pulse source is adapted for emitting an ultrashort pulse, and the synchronisation means are adapted for synchronising timewise two distinct laser pulses incident on a non-linear optical crystal so that said two distinct laser pulses are superimposed timewise in said non-linear optical crystal with a temporal precision of less than or equal to 10% rms of the duration of said ultrashort pulses and preferably less than or equal to 5% rms of the duration of said ultrashort pulses.

According to a particular and advantageous aspect of the invention, the synchronisation means comprise at least one optical delay line disposed between, on the one hand, one of said light pulse sources and, on the other hand, said non-linear optical crystal, the optical delay line being adapted for reducing a time delay between two light pulses incident on said non-linear optical crystal.

According to a particular and advantageous aspect of the invention, the synchronisation means comprise electronic synchronisation means adapted for synchronising timewise two ultrashort laser pulses in a non-linear optical crystal.

In one embodiment, the plurality of light pulse sources comprises a plurality of laser sources, each laser pulse source being adapted for emitting at least one laser pulse.

In another embodiment, the plurality of light pulse sources comprises a common optical oscillator adapted for generating ultrashort parent light pulses of wavelength $\lambda 1$; and a plurality of optical amplifying systems, each optical amplifying system being adapted for receiving an ultrashort parent light pulse of wavelength $\lambda 1$ and for generating an amplified ultrashort light pulse of wavelength $\lambda 1$.

According to a particular and advantageous aspect of the invention, the laser system further comprises a time feedback device comprising a differential cross-correlator adapted to measure a time delay between two distinct laser pulses incident on a non linear optical crystal.

Advantageously, the non-linear optical crystal is a non-linear optical crystal with multiplexing by polarisation or with angular multiplexing, said non-linear optical crystal being chosen from a beta barium borate crystal ($\beta$-$BaB_2O_4$), or a lithium triborate crystal ($LiB_3O_5$) or a lithium niobate crystal ($LiNbO_3$) of the quasi-phase-matched or PPLN type.

In one embodiment, the plurality of distinct laser pulse sources comprises a plurality of laser sources with high-energy fiber optics.

In another embodiment, the plurality of distinct laser pulse sources comprises a plurality of solid laser sources with high-power crystals.

According to particular and advantageous aspect of the second embodiment of the invention, the synchronisation means comprise electronic synchronisation means adapted for timewise synchronising a plurality of laser pulses emitted respectively by said plurality of laser sources.

According to another particular and advantageous aspect of the invention, the non-linear optical system for frequency conversion further comprises:
another source of light pulses adapted for emitting at least one other light pulse at a wavelength;
synchronisation means adapted for synchronising timewise, on the one hand, the light pulse of wavelength $\lambda 2$ generated by frequency conversion at the output of the non-linear optical crystal with, on the other hand, said other light pulse of wavelength $\lambda 1$ emitted by the other source of light pulses, and
another non-linear optical crystal adapted for receiving said light pulse of wavelength $\lambda 2$ and the other light pulse of wavelength $\lambda 1$, said light pulses of respective wavelengths $\lambda 2$ and $\lambda 1$ being synchronised in time, and the other non-linear optical crystal being adapted for generating, by frequency conversion, at least one other light pulse of wavelength $\lambda 3$ different from the wavelengths $\lambda 2$ and $\lambda 1$ of said synchronised light pulses.

In a particular embodiment, the plurality of distinct laser light sources comprises a plurality of high-energy laser sources with fiber optics.

In a particular embodiment, the plurality of distinct laser pulse sources comprises a plurality of solid laser sources with high-power crystals.

The invention also relates to a non-linear optics frequency-conversion method, the method comprising:
a) emission of a plurality of light pulses, respectively by a plurality of light-pulse sources;
b) synchronisation timewise of said plurality of light pulses in order to generate a plurality of synchronised light pulses,
c) reception of the plurality of synchronised light pulses on a non-linear optical crystal, the non-linear optical crystal being adapted for generating, by frequency conversion, at least one output light pulse at a wavelength different from the wavelengths of said light pulses from the light-pulse sources.

Preferentially, step b) of time synchronisation comprises a step of adjusting an optical delay on at least one optical delay line disposed between a light-pulse source and the non-linear optical crystal.

According to a first embodiment, the emission step a) comprises the emission of a plurality of light pulses by an oscillator and the amplification of each of said source pulses by a separate optical amplifier.

According to a second embodiment, the emission step a) comprises the emission of a plurality of laser pulses by a plurality of laser sources, each laser source being adapted for emitting at least one laser pulse.

Advantageously, in the second embodiment, the time synchronisation step b) comprises an electronic synchronisation step adapted for synchronising timewise a plurality of laser pulses emitted by respectively said plurality of laser sources.

The invention will find a particularly advantageous application in ultrashort laser pulse systems.

The invention advantageously makes it possible to combine a plurality of light sources both to convert them in optical frequency and to add together the optical power.

The present invention also relates to the features that will emerge during the following description and which must be considered in isolation or in accordance with any technically possible combinations thereof.

This description is given by way of non-limitative example will give a better understanding as to how the invention can be implemented with reference to the accompanying drawings, wherein.

DETAILED DESCRIPTION

Figure 1:
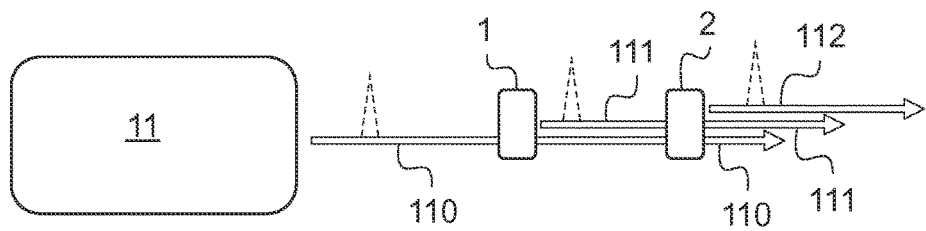
FIG. 1 depicts schematically a frequency-conversion non-linear optical system according to the prior art.
Figure 2:
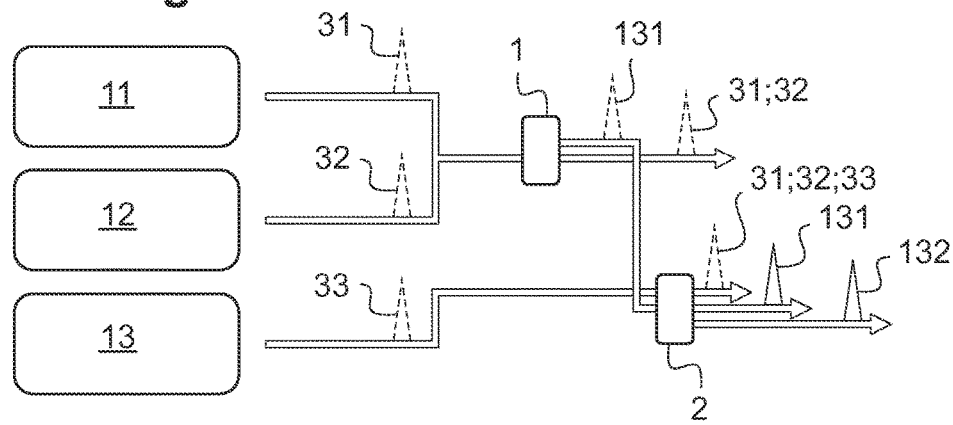
FIG. 2 illustrates schematically the principle of a frequency-conversion non-linear optical system according to the invention.

FIG. 2 shows a UV-visible laser system for high-power and/or high energy ultrashort pulses with conversion by sum frequency. The configuration of the UV-visible laser system proposed is based on the use of distinct laser sources rather than a single source as in the prior system illustrated in FIG. 1.

By way of illustrative example, the system in FIG. 2 comprises three distinct laser sources: a laser source 11, a laser source 12 and a laser source 13. Advantageously, the laser sources 11, 12, 13 are ultrashort-pulse laser sources of the mode locked type.

In general terms, the system of the invention comprises at least two distinct laser sources and up to five distinct ultrashort-pulse laser sources.

In the system in FIG. 2, a first source 11 and a second source 12 are initially considered, which are spatially separate laser sources. The first source 11 emits ultrashort pulses 31 of wavelength λ1 and the second source 12 emits ultrashort pulses 32 of wavelength λ2. The first source 11 and the second source 12 are not coherent with each other. The first source 11 and the second source 12 are arranged so as to couple an ultrashort pulse 31 from the first source 11 and another ultrashort pulse 120 from the second source 12 in a first frequency-conversion non-linear crystal 1. To this end, an optical system may be disposed between the sources 11, 12 and the non-linear optical crystal 1, so as to spatially and temporally superimpose an ultrashort pulse 31 and an ultrashort pulse 32 in the first frequency-conversion non-linear crystal 1.

In nanosecond regime, in order to generate pulses by sum frequency in a non-linear optical crystal, it is essential to control the optical phase between successive incident pulses, in order to ensure stability in terms of power and/or energy of the frequency-converted pulses as a function of time. Controlling the optical phase in general requires the use of a precise interferometric system for measuring the optical phase shift between successive pulses of nanosecond duration.

On the contrary, according to the invention, in addition to fulfilling the phase-matching conditions in the non-linear crystal, the condition necessary and sufficient for producing ultrashort pulses (in picosecond regime, up to 20 ps, or in femtosecond regime) by sum frequency in the non-linear crystal 1, is that an ultrashort pulse 31 and another ultrashort pulse 32 are superimposed in time in the non-linear crystal 1, with any temporal phase relationship between these two pulses 31 and 32. Preferably, the two sources 11, 12 emit, at the same repetition rate, ultrashort pulses 31 and 32 with the same pulse duration, having an energy of the same level, and which overlap spatially in the non-linear optical crystal 1. Temporal control suffices to ensure stability of the efficiency of frequency conversion for a series of ultrashort pulses lying in a time interval ranging from one microsecond up to several minutes. Controlling the temporal synchronisation being carried out without control of the optical phase, no instability is observed from one ultrashort frequency-converted pulse to the following ultrashort pulses, in the same train of pulses, also frequency-converted.

It is therefore a case of ensuring temporal synchronisation between the ultrashort pulses 31 and 32 of the two sources 11 and 12 in the first frequency-conversion non-linear optical crystal 1, with better temporal precision than the duration of the ultrashort pulses. This temporal synchronisation can be provided electronically or optically, as detailed in relation to FIGS. 3 to 5.

The first source 11, and second source 12 and the first non-linear frequency conversion crystal 1 make it possible, subject to synchronisation of the ultrashort pulses 31 and 32, to generate ultrashort pulses 131 having an optical frequency equal to the sum of the respective optical frequencies of the ultrashort source pulses 31 and 32 generated respectively by the sources 11 and 12.

The system in FIG. 2 also comprises a third source 13 and a second frequency-conversion non-linear crystal 2. The third source 13 is separate spatially from the first source 11 and the second source 12 respectively. The first source 11, the second source 12 and the third source 13 are not coherent with each other. The third source 13 emits ultrashort pulses 33 at a wavelength λ3. The second frequency-conversion non-linear optical crystal 2 is disposed on the optical path downstream of the first non-linear optical crystal 1, so as to receive an ultrashort pulse 33 from the third source 13 and an ultrashort pulse 131 generated by sum frequency in the first non-linear optical crystal 1. To this end, an optical system (not shown) is disposed between the third source 13 and the first and second non-linear optical crystals 1, 2.

Under conditions where the ultrashort pulse 33 issuing from the third source 13 and an ultrashort pulse 131 generated by sum frequency in the first non-linear optical crystal 1 are superimposed spatially and temporally in the second non-linear optical crystal 2, the generation of a new ultrashort pulse 132 is observed, the optical frequency of which is equal to the sum of the optical frequencies of the three sources 11, 12 and 13.

It is assumed here that the durations of the two ultrashort pulses 31, 32 and respectively 131, 33 to be combined in a non-linear optical crystal 1, and respectively 2, are identical, whether in picosecond regime or in femtosecond regime.

The synchronisation between the ultrashort pulses 33 and 131 in the second frequency-conversion non-linear optical crystal 2 must be ensured with a temporal precision better than the duration of these pulses. This synchronisation can be achieved in an electronically or optically active manner, as detailed in relation to FIGS. 3 to 5.

The UV-visible laser system with ultrashort pulses thus configured makes it possible to combine the ultrashort laser pulses from a plurality of infrared laser sources 11, 12, 13 synchronised in time with respect to one another, in order to convert in pairs the ultrashort pulses from the various sources by adding successive frequencies in successively disposed non-linear crystals in order to produce ultrashort pulses in the ultraviolet range with strong average power and/or strong energy per pulse.

For example, if the three sources 11, 12, 13 emit ultrashort pulses 31, 32, 33 at the same wavelength, the laser system makes it possible to generate ultrashort pulses at the triple optical frequency, or in other words at a wavelength equal to one third of the wavelength of the sources 11, 12, 13.

The distribution of the initial infrared power in a plurality of sources 11, 12, 13 or a plurality of amplification channels makes it possible, with the limitations of a given technology, to push the reachable performances in power and/or in energy in the ultraviolet domain. The ultrashort pulse 132 obtained by frequency conversion has an energy and respectively a power that increases according to the sum of energy or respectively of power of the source pulses 31, 32, 33. The energy and respectively the power of the ultrashort pulse 132 is not limited by the energy and respectively the power of one of the source pulses 31, 32, 33, but by the sum of the energy and respectively power limits of the various sources 11, 12, 13.

This principle, disclosed in relation to FIG. 2, can be extended to any harmonic degree from the fundamental radiation, to the harmonic degree corresponds to it the number of maximum laser sources that can be combined. Thus, for frequency doubling, two distinct laser sources will be available, for tripling, three laser sources, for quadrupling, from two to four laser sources.

The combination of a supplementary source can be achieved by adding an independent source module and a synchronisation, without necessarily adding a non-linear optical crystal. A laser system combining a plurality of sources makes it possible to ensure the energy and/or power stability of the frequency-converted ultrashort pulses delivered by the system.

The configuration illustrated in FIG. 2 is particularly adapted for ultrashort pulse sources 11, 12, 13, in particular when they are injected by mode-locked laser sources.

In order to obtain the best conversion efficiency and/or the best power stability from one pulse to the following pulse, the time synchronisation of the pulses in a frequency-conversion non-linear optical crystal is controlled and optimised with regard to the duration of the pulses in question, according to various active synchronisation strategies, detailed in relation to FIGS. 3 to 6.

Figure 3:
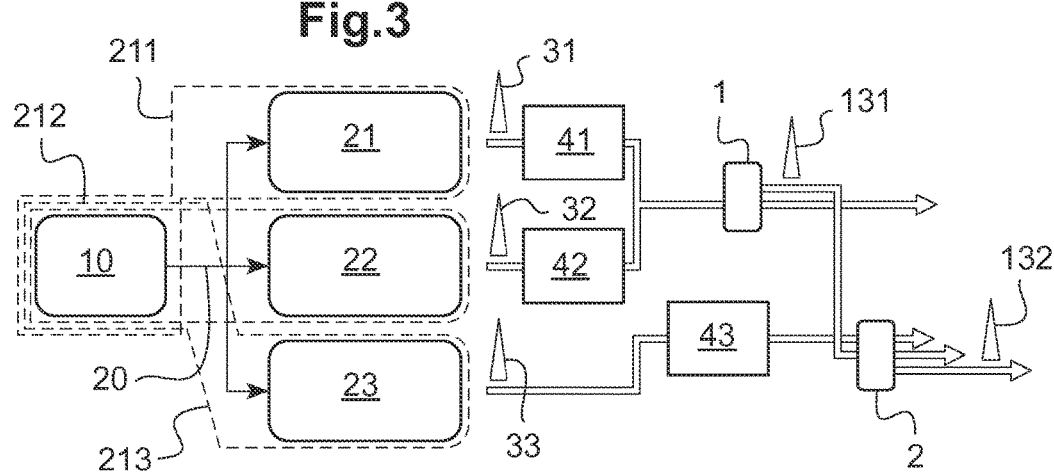
FIG. 3 illustrates schematically a first embodiment of the invention.

FIG. 3 depicts schematically a multi-beam frequency-conversion laser system according to the first embodiment with active optical synchronisation.

The first embodiment is based on the use of a common injection laser source, referred to as the oscillator 10. The oscillator 10 emits ultrashort parent pulses 20. The ultrashort parent pulses 20 are distributed spatially between a plurality of amplification modules, also referred to as optical amplifiers 21, 22, 23. The oscillator 10 and the amplifier 21 form a first source 211 of ultrashort pulses 31. The oscillator 10 and the amplifier 22 form a second source 212 of ultrashort pulses 32. The three sources 211, 212, 213 of ultrashort pulses are thus separated spatially. The oscillator 10 and the amplifier 23 form a third source 213 of ultrashort pulses 33. The system in FIG. 3 comprises a first conversion non-linear optical crystal 1 and a second conversion non-linear optical crystal 2.

Let us consider first of all two optical amplifiers 21, 22 and the first conversion non-linear optical crystal 1. The optical amplifier 21 receives an ultrashort pulse 20 and generates an ultrashort amplified pulse 31. In a similar manner, the optical amplifier 22 receives an ultrashort pulse 20 and generates an amplified ultrashort pulse 32. The amplified ultrashort pulses 31, 32 have the same optical frequency or the same wavelength λ1 and in general the same duration as the parent pulse 20 of the oscillator 10. An optical system, for example with mirrors, not shown in FIG. 2, directs the amplified ultrashort pulses 31, 32 to a first conversion non-linear optical crystal 1. The amplified ultrashort pulses 31 and respectively 32 in each amplifier 21 and respectively 22 do however undergo a time delay that may be different from one optical amplifier 21 to the other optical amplifier 22. This time delay is in general of several picoseconds. It is constant from one pulse to the following pulse, but varies slowly over a period of several minutes. This time delay results in particular from the difference in length of the optical path between the optical channels associated respectively with the optical amplifiers 21 and 22. This time delay depends on the amplification technology, in particular on the amplification time and the material passed through, and on temperature variations that impact on the propagation distance of the pulse during this amplification.

The multi-beam frequency-conversion laser system in FIG. 3 makes provision for disposing at least one optical delay line 41, respectively 42, on at least one channel, for example at the output of the optical amplifier 21 and/or respectively at the output of the optical amplifier 22. An error signal is detected that it is wished to minimise in order to minimise the time delay, for example by means of a cross correlator. The optical delay line or lines 41, 42 make it possible to compensate for the time delay between an amplified ultrashort pulse 31 issuing from an optical amplifier 21 and an amplified ultrashort pulse 32 issuing from the optical amplifier 22. Thus, by using the signal generated by the cross correlator, the amplified ultrashort pulses 31, 32 are synchronised in time in the conversion non-linear optical crystal 1. At the output of the conversion non-linear optical crystal 1, an ultrashort pulse 131 is obtained, doubled in frequency.

Let us consider now another optical amplifier 23 and another conversion non-linear optical crystal 2. Advantageously, the other optical amplifier 23 also receives an ultrashort parent pulse 20 coming from the oscillator 10. The optical amplifier 23 amplifies an ultrashort parent pulse 20 and generates an amplified ultrashort pulse 33 with the same wavelength λ1 as the amplified ultrashort pulses 31 and 32.

An optical system, not shown in FIG. 3, directs the amplified ultrashort pulse 33 and the frequency-converted ultrashort pulse 131 to the other conversion non-linear optical crystal 2.

However, the amplified ultrashort pulse 33 has in general a time delay with respect to the frequency-converted ultrashort pulse 131 coming from the first non-linear optical crystal 1. This time delay is in general of several picoseconds, but it is constant from one pulse to the following pulse, and varies slowly over a period of several minutes. The multi-beam conversion device makes provision for disposing another optical delay line 43 on the channel of the optical amplifier 23, for example at the output of this optical amplifier 23. The optical delay line 43 makes it possible to compensate for the time delay between an amplified ultrashort pulse 33 issuing from the optical amplifier 23 and a frequency-converted ultrashort pulse 131 issuing from the first non-linear optical crystal 1. Thus the amplified ultrashort pulse 33 and the frequency-converted ultrashort pulse 131 are synchronised in time in the conversion non-linear optical crystal 2. At the output of the conversion non-linear optical crystal 2, an ultrashort pulse 132 tripled in frequency with respect to the frequency of the oscillator 10 is obtained.

Several methods may be employed to combine the pulses in the conversion non-linear optical crystals 1, 2. In particular, multiplexing by polarisation and angular multiplexing are considered here. Multiplexing by polarisation consists of disposing two pulses so that each incident pulse in the crystal has a polarisation orthogonal to the other, the type of interaction then being of type II in the conversion crystal. Angular multiplexing consists of disposing two incident pulses so that they form a different angle of incidence in the crystal, provided that the two pulses are superimposed spatially in this same conversion crystal. In the case of angular multiplexing, the two pulses may then have the same polarisation (type I interaction) or an orthogonal polarisation (type II interaction).

The first conversion non-linear optical crystal 1 is for example a type II beta barium borate (or BBO) crystal, and the second conversion non-linear optical crystal 2 is for example also a type II BBO crystal. Advantageously, the non-linear optical crystal is oriented in normal incidence and the cutting angle of the crystal makes it possible to achieve phase matching between the three waves propagating in the crystal. According to the energy levels of the pulses, quasi-phase-matching crystals (such as periodically poled lithium niobate, or PPLN) may be preferred, for low energies (nJ) in colinear configuration, while lithium triborate (or LBO) may be preferred at high energy (mJ), in colinear type II or non-colinear type I.

By way of example, a laser source 11 with femtosecond ytterbium-doped fiber of the prior art is considered. Such a source 11 typically emits pulses 31 of 20 µJ energy per pulse, with a pulse duration of 400 fs, at a center wavelength $\lambda 1$ of 1030 nm and at a rate of 1 MHz. Such a source 11 is limited in energy by the optical non-linearities accumulating during amplification of the previously prestretched pulse in the active fiber. In order to have pulses of energy 18 µJ at a wavelength of 343 nm in the ultraviolet and at 1 MHz, a conventional approach would consist of developing a source emitting at least 60 µJ at 1 MHz, requiring a stretching of the pulse three times greater before amplification or a fiber design having an effective area three times greater. In both cases, it is also necessary to manage a thermal deposition three times greater in this same active fiber.

On the contrary, according to the embodiment illustrated in FIG. 3, three amplifiers 21, 22, 23 are for example used, emitting pulses each having an energy of 20 µJ, injected by the same femtosecond oscillator 10. The synchronisation of the amplified pulses 31, 32, 33 is controlled for example by a differential optical cross-correlation device, which makes it possible to actively adjust the time delay between the three pulses, which are successively combined by sum frequency in the non-linear crystals 1, 2.

This first embodiment makes it possible to obtain high-energy pulses in the ultraviolet without exceeding the thermal deposition limits in each of the optical-fiber amplifiers 21, 22, 23.

The second embodiment uses a plurality of distinct laser sources, synchronised with one another electronically with a temporal precision of less than the pulse duration.

Figure 4:
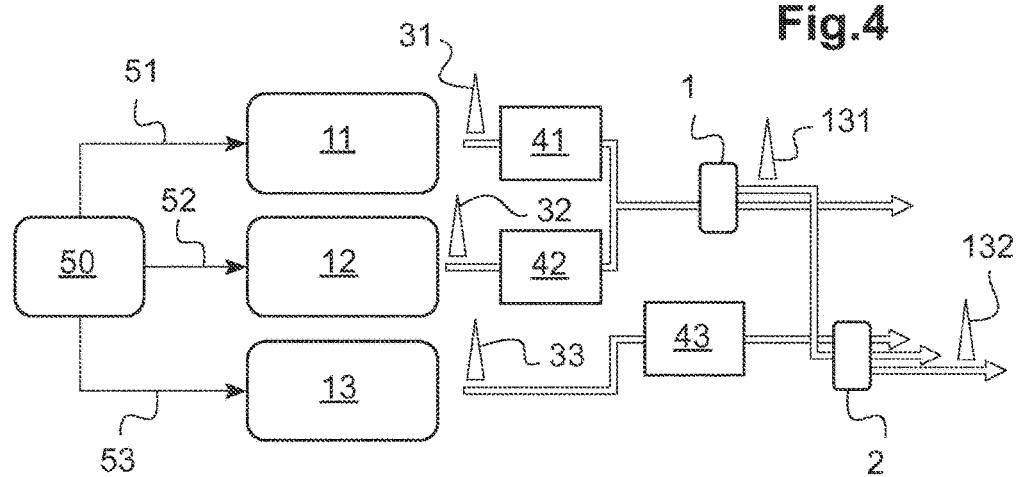
FIG. 4 illustrates schematically a second embodiment of the invention.

FIG. 4 depicts schematically a multibeam frequency conversion optical system according to the second embodiment, with electronic synchronisation.

Let us consider first of all two laser sources 11, 12 and the conversion non-linear optical crystal 1. The laser source 11 emits an ultrashort laser pulse 31. The laser source 12 emits an ultrashort laser pulse 32. The laser sources 11 and 12 are separated spatially. In this case, the laser sources 11 and 12 are not coherent with each other. A conventional electronic synchronisation system 50 is connected, on the one hand, to the laser source 11 by an electronic connection 51 and, on the other hand, to the laser source 12 by an electronic connection 52. The electronic delay between the emission of the laser source 11 and of the laser source 12 is measured by means of a phase detector on electronic signals by a conventional RF technique. The electronic synchronisation system 50 thus makes it possible to temporally synchronise the ultrashort laser pulse 31 and the ultrashort laser pulse 32.

An optical system (not shown) directs the ultrashort laser pulses 31 and 32 to the conversion non-linear optical crystal 1.

In a complementary fashion, as illustrated in FIG. 4, the multibeam conversion system also comprises at least one optical delay line 41 and/or respectively 42, on at least one channel, for example at the output of the laser source 11 and/or respectively at the output of the laser source 12. The relative time delay between an ultrashort laser pulse 31 and an ultrashort laser pulse 32 is for example measured by cross-correlation. The delay line or lines 41, 42 make it possible to compensate for the relative time delay between an ultrashort laser pulse 31 issuing from the laser source 11 and an ultrashort laser pulse 32 issuing from the laser source 12. It is assumed here that the different sources 11, 12 generate ultrashort pulses of the same duration and at the same repetition rate. As indicated above, in ultrashort pulse regime, the time delay between the ultrashort pulses 31, 32 coming from two sources is in general around 1 ps, but this delay is constant from one pulse to the following pulse and varies slowly by the duration of an ultrashort pulse over a period of time of several minutes.

By virtue of the electronic temporal synchronisation system, and optionally by virtue of the delay lines 41, 42, the ultrashort laser pulses 31, 32 are synchronised in time in the conversion non-linear optical crystal 1. At the output of the non-linear optical crystal 1, a frequency doubled ultrashort pulse 131 is obtained. The following pulses 31, 32 are also synchronised.

Let us consider now another laser source 13 and another conversion non-linear optical crystal 2.

The other laser source 13 emits another ultrashort laser pulse 33.

An optical system (not shown in FIG. 4) directs the ultrashort laser pulse 33 and the frequency-converted ultrashort pulse 31 to the other non-linear optical crystal 2.

However, the ultrashort laser pulse 33 in general has a time delay with respect to the frequency-converted ultrashort pulse 131 coming from the conversion non-linear optical crystal 1.

Advantageously, the electronic synchronisation system 50 is connected to the laser source 131 by an electronic connection 53 that makes it possible to synchronise the ultrashort laser pulse 33 with the frequency-converted ultrashort pulse 131 in the conversion non-linear optical crystal 2.

In a complementary fashion, an optical delay line 43 is disposed between the laser source 13 and the conversion non-linear optical crystal 2 in order to refine the synchronisation of the ultrashort laser pulse 33 and of the frequency-converted ultrashort pulse 131 in the conversion non-linear crystal 2.

The conversion non-linear crystal 2 generates an ultrashort pulse 132, by frequency conversion, from the ultrashort laser pulse 33 and the frequency-converted ultrashort pulse 131. The ultrashort pulse 132 has an optical frequency equal to the sum of the optical frequencies of the laser pulse 33 and converted pulse 131. The ultrashort pulse 132 has the same duration and the same spatial profile as an ultrashort laser pulse 31, 32 or 33, with an energy that is dependent on the normal conversion efficiency of the non-linear crystals 1 and/or 2: 50% to 70% for second-harmonic generation (SHG), 20% to 30% for third-harmonic generation (THG), 15% to 25% for fourth-harmonic generation (FHG).

Figure 5:
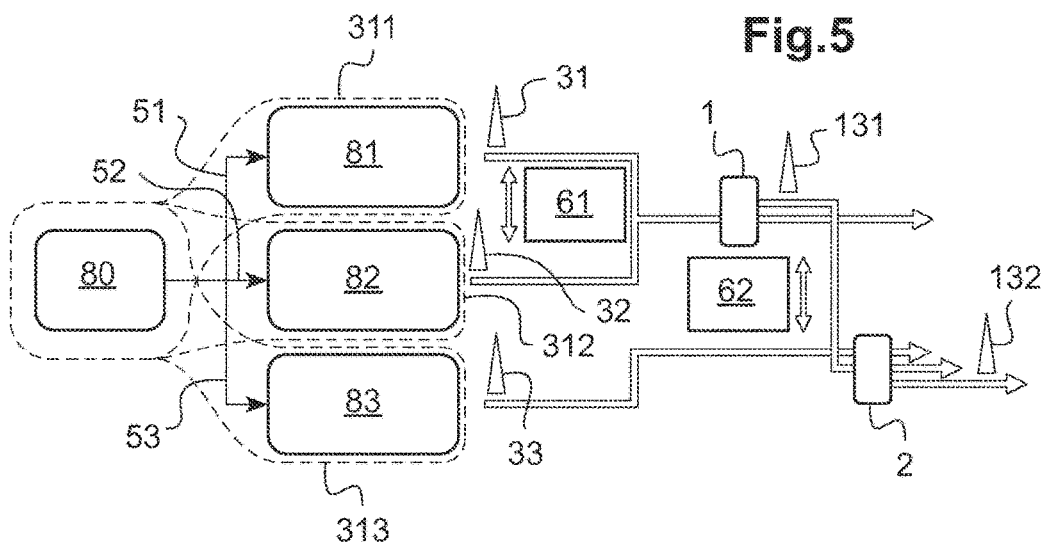
FIG. 5 illustrates schematically a third embodiment of the invention.

FIG. 5 illustrates schematically a third embodiment of the invention.

The same reference signs designate the same elements as in FIG. 4.

The laser system comprises a device 80 comprising a femtosecond oscillator followed by a stretcher, for temporally stretching the pulses delivered by the oscillator. A first amplifying system 81 comprises a first optical amplifier followed by a first compressor for recompressing the amplified pulses. Likewise, a second amplifying system 82 comprises a second optical amplifier followed by a second compressor for recompressing the amplified pulses, and a third amplifying system 83 comprises a third optical amplifier followed by a third compressor for recompressing the amplified pulses. Advantageously, each compressor comprises a translation plate that makes it possible to modify the pulse propagation time. Each compressor of each of the amplifying systems 81, 82, 83 therefore includes the function of recompressing the stretched pulses as well as the optical delay line function. These compressors thus make it possible to adjust the synchronisation between the various amplified pulses 31, 32, 33.

The amplifying system 81 forms with the device 80 a first source 311 of ultrashort pulses 31. In a similar manner, the amplifying system 82 forms with the device 80 a second source 312 of ultrashort pulses 32. Finally, the amplifying system 83 forms with the device 80 a third source 313 of ultrashort pulses 33.

In a variant of this third embodiment, optical synchronisation means and electronic synchronisation means are combined in the same laser system. This combination makes it possible to benefit from the synchronisation dynamics particular to each technique, and thus to decorrelate the feedback loops.

The laser system in FIG. 5 also comprises a differential cross-correlator 61 disposed between the output of the first amplifying system 81 and of the second amplifying system 82 in order to measure the time delay between an ultrashort pulse 31 and an ultrashort pulse 32. The laser system in FIG. 5 also comprises another differential cross-correlator 62 disposed between the output of the first conversion non-linear optical crystal 1 and the output of the third amplifying system 83 in order to measure the time delay between a frequency-converted ultrashort pulse 131 and an ultrashort pulse 33 issuing from the third amplifying system 83.

Figure 6:
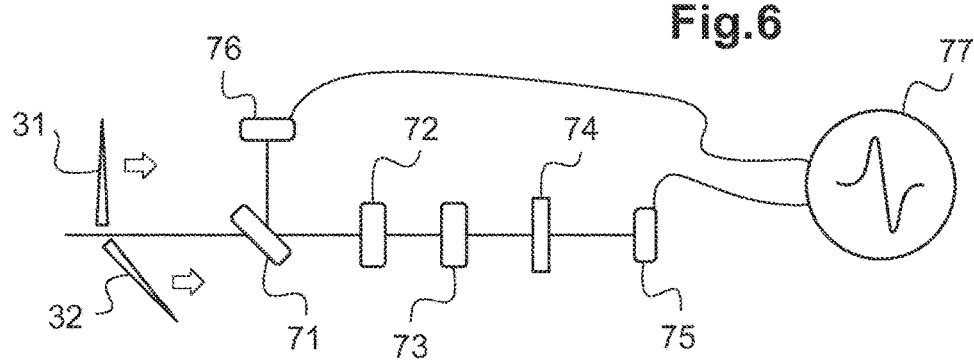
FIG. 6 illustrates schematically a differential cross-correlator device for measuring the optical delay between two laser pulses.

FIG. 6 illustrates schematically a differential cross-correlator device for measuring the optical delay between two ultrashort laser pulses.

A differential cross-correlator is based on a device with two non-linear crystals in series, or on a device comprising a non-linear optical crystal used in double pass, through which the two pulses the time synchronisation of which it is sought to provide pass.

In the example illustrated in FIG. 6, two ultrashort pulses 31, 32 to be synchronised have cross-polarisation, passing through a first dichroic mirror 71. The parts of each ultrashort pulse 31, 32 overlap timewise with each other are converted by sum frequency in a sum frequency non-linear optical crystal 72, the total energy of this frequency-converted pulse is measured on the detector 75 through the second dichroic mirror 74. By reflection of the fundamental wave on the second dichroic mirror 74, each pulse undergoes a total different delay twice because of the double passage through the birefringent plate 73. The overlap zones of the two pulses are no longer the same, and the converted energy is then measured on the second detector 76 by reflection on the first dichroic mirror 71. The difference 77 between the two signals measured by the detectors 75 and 76 provides an indicator of the delay between the two pulses 31 and 32 and an indicator of the direction of the delay. This error signal 77 can therefore be sent directly in a feedback loop to an optical delay line on one of the two compressors of the amplifying systems 81, 82 for example.

In an alternative and/or complementary manner, the system of the invention comprises passive synchronisation means adapted for stabilising the time synchronisation between the ultrashort pulses issuing from the various sources in a frequency-converter non-linear optical crystal. These passive synchronisation means comprise for example a device for mechanical stabilisation towards vibrations so as to reduce the optical delay fluctuations between ultrashort pulses incident on the same non-linear optical crystal. The passive synchronisation means may also comprise thermal stabilisation means so as to reduce the thermally induced optical delay fluctuations between ultrashort pulses: for example, the supports of the mirrors on the optical path of the ultrashort pulses are preferably made of Invar so as to limit thermal drifts.

The invention is in no way limited to the embodiments described here.

The invention applies in particular to an embodiment with four sources of ultrashort pulses with the same optical frequency and three non-linear optical crystals, in order to form ultrashort pulses with an optical frequency equal to the fourth harmonic of the optical frequency of the four sources.

This embodiment makes it possible, from sources emitting in the infrared, to generate ultrashort pulses in the UV range of high power and/or high energy, and having a conversion efficiency that is stable from one pulse to another.

Likewise, the invention applies to an embodiment with five sources of ultrashort pulses of the same optical frequency and four non-linear optical crystals, in order to form ultrashort pulses with an optical frequency equal to the fifth harmonic of the optical frequency of the five sources.

A first industrial application of the invention relates to the implementation of a laser source of ultrashort pulses with high energy in the UV range, using optical-fiber lasers, each fiber optic being limited in energy. Such a system offers the advantage of delivering high-energy ultrashort pulses in the UV range, with great energy stability from one pulse to the following pulse in a train of pulses.

Another industrial application of the invention relates to the implementation of a laser source of ultrashort pulses of high power in the UV range using crystal solid lasers, each crystal laser being limited in power. Such a system offers the advantage of delivering high-power ultrashort pulses in the UV range, with great power stability from one pulse to the following pulse in a train of pulses.

Adjusting the time synchronisation is easier and more robust than adjusting an interferometric system.

The system of the invention has the advantage of being modular and relatively inexpensive. It is easy to add or to replace one source module with another, in order to adapt the power or energy of the ultrashort pulses output. This system also offers the advantage of facilitating maintenance, by the replacement of a module, independently from the rest of the system.

The invention claimed is:

1. UV-visible laser system having ultra-short high power and/or high energy pulses comprising:
    a plurality of laser pulse sources, where the plurality of sources comprises between two and five distinct sources, each source being adapted for emitting at least one ultrashort laser pulse in the visible or infrared domain;
    at least one non-linear optical crystal adapted for receiving two ultrashort laser pulses, said two ultrashort laser pulses being emitted respectively by two distinct laser pulse sources; and
    synchronization means adapted for synchronizing in time said two ultrashort laser pulses incident on said non-linear optical crystal, so that said two ultrashort laser pulses are superimposed in time and space in said non-linear optical crystal with any phase shift,
    said at least one non-linear optical crystal being adapted for generating, by sum frequency, a frequency converted ultrashort laser pulse, having an optical frequency equal to the sum of the respective optical frequencies of the two ultrashort laser pulses superimposed in time and space in said non-linear optical crystal, and
    N non-linear optical crystals, where N is an integer number greater than or equal to two, each non-linear optical crystal being adapted for receiving two distinct laser pulses emitted respectively by two distinct laser pulse sources or generated by sum frequency conversion from two ultrashort laser pulse sources, said two laser pulses incident on a non-linear optical crystal being synchronized timewise, and said N non-linear optical crystals being disposed so as to generate, by successive sum frequency in said N non-linear optical crystals, a frequency-converted laser pulse.

2. UV-visible laser system having ultra-short high power and/or high energy pulses according to claim 1, comprising:
    two distinct laser pulse sources, each laser pulse source, being adapted for emitting an ultrashort laser pulse in the visible or infrared domain; and
    a non-linear optical crystal adapted for receiving simultaneously an ultrashort laser pulse (21, 32) from each of the two distinct laser pulse sources,
    the non-linear optical crystal being adapted for generating, by sum frequency, an ultrashort laser pulse, having an optical frequency equal to the sum of the optical frequencies of the two sources.

3. UV-visible laser system having ultra-short high power and/or high energy pulses according to claim 2, wherein said plurality of light pulse sources comprises:
    a common optical oscillator adapted for generating ultra-short parent light pulses of wavelength $\lambda 1$; and
    a plurality of optical amplifying systems, each optical amplifying system being adapted for receiving an ultra-short parent pulse of wavelength $\lambda 1$ and for generating an amplified ultrashort light pulse of wavelength $\lambda 1$.

4. UV-visible laser system having ultra-short high power and/or high energy pulses according to claim 1, comprising:
    three distinct laser pulse sources, each laser pulse source being adapted for emitting an ultrashort laser pulse in the visible or infrared domain; and
    a first non-linear optical crystal adapted for receiving simultaneously two ultrashort laser pulses emitted respectively by two from among the three distinct laser pulse sources,
    the temporal synchronization means being adapted for synchronizing timewise said two laser pulses incident on the first non-linear optical crystal so that said two distinct laser pulses are superimposed in time and space in the first non-linear optical crystal with any phase shift, the first non-linear optical crystal being adapted for generating, by sum frequency, a frequency-converted ultrashort laser pulse having an optical frequency equal to the sum of the optical frequencies of said two sources,
    a second non-linear optical crystal being adapted for receiving simultaneously said frequency-converted ultrashort laser pulse and another ultrashort laser pulse emitted respectively by the other laser pulse source from among the three laser pulse sources,
    the synchronization means being adapted for synchronizing timewise said frequency converted laser pulse and said other laser pulse that are incident on the second non-linear optical crystal so that said ultrashort laser pulses are superimposed in time and space in the second non-linear optical crystal with any phase shift, the second non-linear optical crystal being adapted for generating, by sum frequency, an ultrashort laser pulse having an optical frequency equal to the sum of the optical frequencies of said three sources.

5. UV-visible laser system having ultra-short high power and/or high energy pulses according to claim 4, wherein said plurality of light pulse sources comprises:
    a common optical oscillator adapted for generating ultra-short parent light pulses of wavelength $\lambda 1$; and
    a plurality of optical amplifying systems, each optical amplifying system being adapted for receiving an ultra-short parent pulse of wavelength $\lambda 1$ and for generating an amplified ultrashort light pulse of wavelength $\lambda 1$.

6. UV-visible laser system having ultra-short high power and/or high energy pulses according to claim 1, wherein the synchronization means comprise at least one optical delay line disposed between, on the one hand, one of said light pulse sources and said non-linear optical crystal, the optical delay line being adapted for reducing a time delay between two light pulses incident on said non-linear optical crystal.

7. UV-visible laser system having ultra-short high power and/or high energy pulses according to claim 1, wherein said plurality of light pulse sources comprises a plurality of laser sources, each laser pulse source being adapted for emitting at least one ultrashort laser pulse.

8. UV-visible laser system having ultra-short high power and/or high energy pulses according to claim 1, wherein said plurality of light pulse sources comprises:
    a common optical oscillator adapted for generating ultra-short parent light pulses of wavelength $\lambda 1$; and
    a plurality of optical amplifying systems, each optical amplifying system being adapted for receiving an ultra-short parent pulse of wavelength $\lambda 1$ and for generating an amplified ultrashort light pulse of wavelength $\lambda 1$.

9. UV-visible laser system having ultra-short high power and/or high energy pulses according to claim 1, further comprising a temporal feedback device, comprising a differential cross-correlator adapted for measuring a time delay between two distinct laser pulses incident on a non-linear optical crystal.

10. UV-visible laser system having ultra-short high power and/or high energy pulses according to claim 1, wherein the plurality of distinct laser pulse sources comprises a plurality of high-energy fiber optics laser sources.

11. UV-visible laser system having ultra-short high power and/or high energy pulses according to claim 1, wherein the plurality of distinct laser pulse sources comprises a plurality of high-power crystals laser sources.

12. UV-visible laser system having ultra-short high power and/or high energy pulses comprising:
a plurality of laser pulse sources, where the plurality of sources comprises between two and five distinct sources, each source being adapted for emitting at least one ultrashort laser pulse in the visible or infrared domain;
at least one non-linear optical crystal adapted for receiving two ultrashort laser pulses, said two ultrashort laser pulses being emitted respectively by two distinct laser pulse sources; and
synchronization means adapted for synchronizing in time said two ultrashort laser pulses incident on said non-linear optical crystal, so that said two ultrashort laser pulses are superimposed in time and space in said non-linear optical crystal with any phase shift,
said at least one non-linear optical crystal being adapted for generating, by sum frequency, a frequency converted ultrashort laser pulse, having an optical frequency equal to the sum of the respective optical frequencies of the two ultrashort laser pulses superimposed in time and space in said non-linear optical crystal,
wherein each laser pulse source is adapted for emitting an ultrashort pulse, and wherein the synchronization means are adapted for synchronizing timewise two distinct laser pulses incident on a non-linear optical crystal so that said two distinct laser pulses are superimposed timewise in said non-linear optical crystal with a temporal precision of less than or equal to 10% rms of the duration of said ultrashort pulses.

13. UV-visible laser system having ultra-short high power and/or high energy pulses according to claim 12, wherein the synchronization means comprise at least one optical delay line disposed between, on the one hand, one of said light pulse sources and said non-linear optical crystal, the optical delay line being adapted for reducing a time delay between two light pulses incident on said non-linear optical crystal.

14. UV-visible laser system having ultra-short high power and/or high energy pulses according to claim 12, wherein the synchronization means comprise electronic synchronization means adapted for synchronizing timewise two ultrashort laser pulses in a non-linear optical crystal.

15. UV-visible laser system having ultra-short high power and/or high energy pulses, comprising:
a plurality of laser pulse sources, where the plurality of sources comprises between two and five distinct sources, each source being adapted for emitting at least one ultrashort laser pulse in the visible or infrared domain;
at least one non-linear optical crystal adapted for receiving two ultrashort laser pulses, said two ultrashort laser pulses being emitted respectively by two distinct laser pulse sources; and
synchronization means adapted for synchronizing in time said two ultrashort laser pulses incident on said non-linear optical crystal, so that said two ultrashort laser pulses are superimposed in time and space in said non-linear optical crystal with any phase shift,
said at least one non-linear optical crystal being adapted for generating, by sum frequency, a frequency converted ultrashort laser pulse, having an optical frequency equal to the sum of the respective optical frequencies of the two ultrashort laser pulses superimposed in time and space in said non-linear optical crystal,
wherein the synchronization means comprise electronic synchronization means adapted for synchronizing timewise two ultrashort laser pulses in a non-linear optical crystal.

16. UV-visible laser system having ultra-short high power and/or high energy pulses according to claim 15, further comprising a temporal feedback device, comprising a differential cross-correlator adapted for measuring a time delay between two distinct laser pulses incident on a non-linear optical crystal.

17. UV-visible laser system having ultra-short high power and/or high energy pulses according to claim 15, wherein the synchronization means comprise at least one optical delay line disposed between, on the one hand, one of said light pulse sources and said non-linear optical crystal, the optical delay line being adapted for reducing a time delay between two light pulses incident on said non-linear optical crystal.

18. UV-visible laser system having ultra-short high power and/or high energy pulses according to claim 15, wherein said plurality of light pulse sources comprises a plurality of laser sources, each laser pulse source being adapted for emitting at least one ultrashort laser pulse.

19. UV-visible laser system having ultra-short high power and/or high energy pulses according to claim 15, wherein said plurality of light pulse sources comprises:
a common optical oscillator adapted for generating ultrashort parent light pulses of wavelength $\lambda 1$; and
a plurality of optical amplifying systems, each optical amplifying system being adapted for receiving an ultrashort parent pulse of wavelength $\lambda 1$ and for generating an amplified ultrashort light pulse of wavelength $\lambda 1$.

20. UV-visible laser system having ultra-short high power and/or high energy pulses, comprising:
a plurality of laser pulse sources, where the plurality of sources comprises between two and five distinct sources, each source being adapted for emitting at least one ultrashort laser pulse in the visible or infrared domain;
at least one non-linear optical crystal adapted for receiving two ultrashort laser pulses, said two ultrashort laser pulses being emitted respectively by two distinct laser pulse sources; and
synchronization means adapted for synchronizing in time said two ultrashort laser pulses incident on said non-linear optical crystal, so that said two ultrashort laser pulses are superimposed in time and space in said non-linear optical crystal with any phase shift,
said at least one non-linear optical crystal being adapted for generating, by sum frequency, a frequency converted ultrashort laser pulse, having an optical frequency equal to the sum of the respective optical frequencies of the two ultrashort laser pulses superimposed in time and space in said non-linear optical crystal,
wherein said non-linear optical crystal is a non-linear optical crystal with multiplexing by polarization or with angular multiplexing, said non-linear optical crystal being chosen from a beta barium borate crystal (β-BaB$_2$O$_4$), or a lithium triborate crystal (LiB$_3$O$_5$) or a lithium niobate crystal (LiNbO$_3$) of the quasi-phase-matched or PPLN type.

21. UV-visible laser system having ultra-short high power and/or high energy pulses, comprising:
    a plurality of laser pulse sources, where the plurality of sources comprises between two and five distinct sources, each source being adapted for emitting at least one ultrashort laser pulse in the visible or infrared domain;
    at least one non-linear optical crystal adapted for receiving two ultrashort laser pulses, said two ultrashort laser pulses being emitted respectively by two distinct laser pulse sources; and
    synchronization means adapted for synchronizing in time said two ultrashort laser pulses incident on said non-linear optical crystal, so that said two ultrashort laser pulses are superimposed in time and space in said non-linear optical crystal with any phase shift,
    said at least one non-linear optical crystal being adapted for generating, by sum frequency, a frequency converted ultrashort laser pulse, having an optical frequency equal to the sum of the respective optical frequencies of the two ultrashort laser pulses superimposed in time and space in said non-linear optical crystal,
    wherein the plurality of distinct laser pulse sources comprises a plurality of high-energy fiber optics laser sources.

22. UV-visible laser system having ultra-short high power and/or high energy pulses according to claim 21, wherein said plurality of light pulse sources comprises a plurality of laser sources, each laser pulse source being adapted for emitting at least one ultrashort laser pulse.

23. UV-visible laser system having ultra-short high power and/or high energy pulses, comprising:
    a plurality of laser pulse sources, where the plurality of sources comprises between two and five distinct sources, each source being adapted for emitting at least one ultrashort laser pulse in the visible or infrared domain;
    at least one non-linear optical crystal adapted for receiving two ultrashort laser pulses, said two ultrashort laser pulses being emitted respectively by two distinct laser pulse sources; and
    synchronization means adapted for synchronizing in time said two ultrashort laser pulses incident on said non-linear optical crystal, so that said two ultrashort laser pulses are superimposed in time and space in said non-linear optical crystal with any phase shift,
    said at least one non-linear optical crystal being adapted for generating, by sum frequency, a frequency converted ultrashort laser pulse, having an optical frequency equal to the sum of the respective optical frequencies of the two ultrashort laser pulses superimposed in time and space in said non-linear optical crystal,
    wherein the plurality of distinct laser pulse sources comprises a plurality of high-power crystals laser sources.

24. UV-visible laser system having ultra-short high power and/or high energy pulses according to claim 23, wherein said plurality of light pulse sources comprises a plurality of laser sources, each laser pulse source being adapted for emitting at least one ultrashort laser pulse.

* * * * *